(12) United States Patent
Knoop et al.

(10) Patent No.: US 10,323,705 B2
(45) Date of Patent: Jun. 18, 2019

(54) ADJUSTER ASSEMBLY

(71) Applicant: Meritor Heavy Vehicle Braking Systems (UK) Limited, Cwmbran Gwent (GB)

(72) Inventors: Dietmar Knoop, Cwmbran Gwent (GB); Sean Cleary, Cwmbran Gwent (GB)

(73) Assignee: Meritor Heavy Vehicle Braking Systems (UK) Limited, Cwmbran Gwent (GB)

( * ) Notice: Subject to any disclaimer, the term of this patent is extended or adjusted under 35 U.S.C. 154(b) by 0 days.

(21) Appl. No.: 15/373,192

(22) Filed: Dec. 8, 2016

(65) Prior Publication Data
US 2017/0167556 A1    Jun. 15, 2017

(30) Foreign Application Priority Data

Dec. 10, 2015 (EP) .................................... 15275260
Dec. 10, 2015 (EP) .................................... 15275261

(51) Int. Cl.
*F16D 55/00* (2006.01)
*F16D 65/00* (2006.01)
*F16D 65/40* (2006.01)
*F16D 65/42* (2006.01)
(Continued)

(52) U.S. Cl.
CPC ......... *F16D 65/42* (2013.01); *F16D 55/2255* (2013.01); *F16D 65/0043* (2013.01);
(Continued)

(58) Field of Classification Search
CPC ...... F16D 65/42; F16D 65/0043; F16D 65/40; F16D 65/52; F16D 55/226;
(Continued)

(56) References Cited

U.S. PATENT DOCUMENTS 6,276,494 B1 * 8/2001 Ward .................... F16D 65/183
188/1.11 L
7,322,447 B2 * 1/2008 Deckhut ................. F16D 65/18
188/1.11 L
(Continued)

FOREIGN PATENT DOCUMENTS

CN    101067427 A    11/2007
DE    19923457 C1    11/2000
(Continued)

OTHER PUBLICATIONS

The Chinese Patent Office, Office Action for corresponding Application No. CN201611048910.2, dated May 25, 2018.
(Continued)

*Primary Examiner* — Pamela Rodriguez
(74) *Attorney, Agent, or Firm* — Brooks Kushman P.C.

(57) ABSTRACT

An adjuster assembly for manually adjusting the position of a brake pad relative to a brake rotor of a disc brake, the assembly comprising: a continuous wear sensor; and a manual rewind apparatus to manually reset the position of the brake pad when replacement thereof is required; the manual rewind apparatus comprising a shaft arranged to extend into a housing of the disc brake; wherein the continuous wear sensor is arranged to be located within the housing of the disc brake and is located proximate to the shaft.

17 Claims, 11 Drawing Sheets

(51) Int. Cl.
*F16D 65/52* (2006.01)
*F16D 66/02* (2006.01)
*F16D 55/226* (2006.01)
*F16D 55/2255* (2006.01)

(52) U.S. Cl.
CPC ............ *F16D 65/40* (2013.01); *F16D 65/52* (2013.01); *F16D 66/021* (2013.01); *F16D 66/027* (2013.01); *F16D 55/226* (2013.01); *F16D 2055/0016* (2013.01)

(58) Field of Classification Search
CPC .. F16D 55/2255; F16D 66/027; F16D 66/021; F16D 2055/0016
USPC ................ 188/1.11 L, 1.11 E, 71.9, 196 R
See application file for complete search history.

(56) References Cited

U.S. PATENT DOCUMENTS

| | | | |
|---|---|---|---|
| 8,047,336 B2* | 11/2011 | Niehorster | F16D 65/54 188/1.11 L |
| 9,618,067 B2* | 4/2017 | Philpott | F16D 65/66 |
| 9,981,647 B2* | 5/2018 | Welin | B60T 17/22 |
| 2014/0250662 A1 | 9/2014 | Sandberg et al. | |
| 2015/0068852 A1 | 3/2015 | Weber et al. | |

FOREIGN PATENT DOCUMENTS

| | | |
|---|---|---|
| EP | 1233202 A2 | 8/2002 |
| EP | 1596092 A1 | 11/2005 |
| EP | 1852628 A1 | 11/2007 |
| EP | 2292945 A1 | 3/2011 |
| EP | 2602506 A1 | 6/2013 |
| EP | 2653744 A1 | 10/2013 |
| GB | 2304387 A | 3/1997 |
| WO | 2013001330 A1 | 1/2013 |

OTHER PUBLICATIONS

European Patent Office, Extended European Search Report for the corresponding European Patent Application No. 15275260.6 dated Jun. 8, 2016.
European Patent Office, Extended European Search Report for the corresponding European Patent Application No. 15275261.4 dated Jun. 8, 2016.
European Patent Office, Extended European Search Report for the corresponding European Patent Application No. 16202583.7 dated Apr. 13, 2017.
The Chinese Patent Office, The Second Office Action for corresponding Application No. CN201611048910.2, dated Nov. 9, 2018.

* cited by examiner

ADJUSTER ASSEMBLY

TECHNICAL FIELD

The present invention relates to an adjuster assembly. In particular, the present invention relates to an adjuster assembly that forms part of an adjuster system for adjusting the position of a brake pad in a disc brake. The present invention also relates to a disc brake assembly having an adjuster assembly.

BACKGROUND

Many air actuated disc brakes, for use on heavy vehicles, have an adjuster mechanism to set the position of friction element to account for the wear thereof. Generally, the adjuster mechanism has an adjuster shaft of which an end portion is accessible from the exterior of the brake housing and is operable to manually re-wind or de-adjust the adjuster to permit removal of worn friction elements (commonly known as brake pads) and replacement thereof with new thicker elements and/or other servicing procedures.

In some installations air actuated disc brakes are also fitted with electrical continuous wear sensors (CWS) which monitor the amount of friction material remaining on the friction elements. This enables to the operator to monitor and plan for when the friction elements will need replacing.

In conventional adjuster mechanisms having such a continuous wear sensor, the sensor is mounted to the brake housing as a standalone unit that is located away from the manual adjuster. This results in a system wherein the continuous wear sensor takes up a relatively large amount of space in the brake housing. On disc brakes that do not use a CWS this space is redundant. In other brakes it is mounted to an exterior of the housing where it may be susceptible to corrosion and damage.

If excessive torque is used when manually re-winding the adjuster, the adjuster can become locked or jammed in the fully rewound end position. This can lead to reduced performance of the brake pads and/or torque generation by the brake pads, due to the clearance between the brake pads and the brake disc being too high to generate sufficient clamping of the brake disc. Similarly, if excessive torque is used to wind the mechanism forward to take up excess running clearance once new brake pads are fitted, the adjuster can be locked in an advanced position, potentially leading to overheating of the friction material of the brake pads and/or the rotor.

It is known to address this problem by using a "fuse" component on the adjuster shaft configured to shear off when excessive torque is applied and be easily replaced by a new fuse (e.g., that is provided with a set of new brake pads). It is also known to address this problem with the provision of instructions to the operator as to the maximum safe torque. However, a careless operator can ignore such instructions, or can inadvertently use excess torque, particularly if a power tool such as an impact wrench is used in re-winding or advancing.

In some installations, the brakes are also fitted with electrical continuous wear sensors (CWS) which monitor the amount of friction material remaining on the friction elements. This enables the operator to monitor and plan for when the friction elements will need replacing.

It is known for a continuous wear sensor to be mounted adjacent the adjuster shaft in a cast caliper housing of the disc brake, with apertures or recesses provided for each component. In existing arrangements, the housing has apertures or recesses for each component on three separate planes, and thus requires three separate machining operations after casting. In addition, the machined surfaces are devoid of protective coating, so require additional treatment to inhibit corrosion.

The present invention aims to alleviate or overcome the problems associated with the prior art.

SUMMARY

A first aspect of the invention provides an adjuster assembly for manually adjusting the position of a brake pad relative to a brake rotor of a disc brake, the assembly comprising a continuous wear sensor and a manual rewind apparatus to manually reset the position of the brake pad when replacement thereof is required. The manual rewind apparatus comprising a shaft arranged to extend into a housing of the disc brake wherein the continuous wear sensor is arranged to be located within the housing of the disc brake and is located proximate to the shaft.

Combination of the manual rewind apparatus and the continuous wear sensor into a single assembly results in a smaller overall component requiring less space in the housing thus resulting in improved packaging of the disc brake caliper.

In one embodiment, the continuous wear sensor is arranged as part of a single unit with the manual rewind apparatus.

Providing the continuous wear sensor and manual adjuster as a single unit enables easier fitting and removal to the system as both components are fitted/removed together.

In one embodiment, the adjuster assembly further comprises a cover arranged to mount the adjuster assembly to a housing of the disc brake.

In one embodiment, the cover further comprises a sleeve, wherein the sleeve substantially surrounds a portion of the shaft.

Further improves the packaging efficiency of the assembly.

In one embodiment, the shaft defines a longitudinal axis and the continuous wear sensor defines a longitudinal axis and the longitudinal axis of the shaft is substantially parallel to the longitudinal axis of the continuous wear sensor.

In one embodiment, the continuous wear sensor is mounted concentrically around the shaft.

Further improves the packaging efficiency of the assembly.

In one embodiment, the continuous wear sensor comprises a first part that is arranged to move in response to rotation of the shaft so as to indirectly sense the wear of a brake pad.

In one embodiment, the first part is arranged to move linearly or the first part is arranged to move rotationally with respect to a second part which remains substantially stationary.

In one embodiment, the first part is mounted such that rotation of the shaft causes threadable linear motion of the first part relative to the shaft, optionally wherein the shaft is threaded.

In one embodiment, the sleeve is arranged to prevent rotation of the first part.

In one embodiment, the continuous wear system further comprises a resilient element mounted between the first part and the second part.

In one embodiment, the second part is a load sensor.

A second aspect of the invention provides a disc brake assembly comprising a brake caliper having a housing and an adjuster assembly according to the first aspect of the invention wherein the continuous wear sensor is mounted to the housing via the adjuster assembly.

In one embodiment, the housing comprises a recess for mounting the shaft to the disc brake assembly.

In one embodiment, the adjuster assembly comprises a cover, the cover being arranged to mount the shaft and the continuous wear sensor to the housing.

A third aspect of the invention provides a manual rewind apparatus configured to reset the position of a brake pad relative to a brake disc when replacement thereof is required. The manual rewind apparatus comprises a transmission path extending from a rewind tool engaging component via an adjuster shaft to a brake pad engaging portion. The transmission path comprises a clutch mechanism configured to slip at a predetermined torque. The manual rewind apparatus is a self-contained module configured for fitting to and/or removal from an adjuster system as a unit.

The self-contained module is quick and easy to fit and replace.

The clutch mechanism may be integral to the tool engaging component and the adjuster shaft.

The clutch mechanism may comprise a first clutch portion integral to the tool engaging component and a second clutch portion integral to the adjuster shaft, and wherein the first and second clutch portions are configured to slip with respect to one another at a predetermined torque.

The clutch mechanism being integral to existing components reduces the number of components required, thus reducing cost and advantageously leading to a more compact arrangement.

The first and second clutch portions may comprise corresponding teeth configured to frictionally engage with one another up to a predetermined torque and to slip with respect to one another beyond that predetermined torque.

The angle of the teeth may be configured to define the predetermined torque. This arrangement provides a simple means of limiting the torque transferred to the adjuster shaft.

The teeth may comprise first corresponding faces at a first angle and second corresponding faces at a second angle. The predetermined torque limit can thus be customized for each direction of winding.

The teeth may extend in an axial direction. Alternatively, the teeth may extend in a radial direction. The teeth may be curved.

The first clutch portion may be of plastics material. The first clutch portion being of plastics material advantageously reduces cost and weight.

The clutch mechanism may be configured to slip at a first predetermined torque in a first direction and at a second predetermined torque in a second direction.

There is further provided a disc brake assembly comprising a brake caliper, an adjuster assembly for adjusting the position of a brake pad relative to a brake disc so as to maintain a suitable running clearance between the pad and disc in a disc brake, the adjuster assembly comprising a continuous wear sensor and a manual rewind apparatus as described above, and a housing configured to receive the manual rewind apparatus and to protect the remainder of the adjuster assembly.

The housing thus carries out two functions, advantageously reducing the number of components. The housing provides support for the manual rewind apparatus and also protects the remainder of the adjuster assembly, without the need for a separate cover.

The manual rewind apparatus may be substantially wholly received in the housing.

The housing may define an aperture for the continuous wear sensor and an aperture for the manual rewind apparatus. The housing may define an aperture for a fastener.

The housing may comprise an outer face defining said apertures, and said face may be planar. This is a compact arrangement that allows the clutch mechanism to be protected by the housing.

The housing may be of plastics material, advantageously reducing cost and weight.

The assembly may further comprise a cap configured for attachment to the outer face of the housing so as to protect the manual rewind apparatus.

The assembly may yet further comprise a sensor configured to detect attachment of the cap. This makes it easy to see if the cap is correctly fitted and the manual rewind apparatus thus properly protected.

There is also provided a manual rewind apparatus configured to reset the position of a brake pad relative to a brake disc when replacement thereof is required. The manual rewind apparatus comprises a transmission path extending from a rewind tool engaging component via an adjuster shaft to a brake pad engaging portion. The transmission path comprises a clutch mechanism configured to slip at a predetermined torque. The clutch mechanism is integral to the tool engaging component and the adjuster shaft.

The clutch mechanism may comprise a first clutch portion integral to the tool engaging component and a second clutch portion integral to the adjuster shaft, and wherein the first and second clutch portions are configured to slip with respect to one another at a predetermined torque.

The clutch mechanism being integral to existing components reduces the number of components required, thus reducing cost and advantageously leading to a more compact arrangement.

The first and second clutch portions may comprise corresponding teeth configured to frictionally engage with one another up to a predetermined torque and to slip with respect to one another beyond that predetermined torque.

The angle of the teeth may be configured to define the predetermined torque. This arrangement provides a simple means of limiting the torque transferred to the adjuster shaft.

The teeth may comprise first corresponding faces at a first angle and second corresponding faces at a second angle. The predetermined torque limit can thus be customized for each direction of winding.

The teeth may extend in an axial direction. Alternatively, the teeth may extend in a radial direction. The teeth may be curved.

The first clutch portion may be of plastics material. The first clutch portion being of plastics material advantageously reduces cost and weight.

The clutch mechanism may be configured to slip at a first predetermined torque in a first direction and at a second predetermined torque in a second direction.

A further aspect of the invention provides a manual rewind apparatus configured to reset the position of a brake pad relative to a brake disc when replacement thereof is required. The manual rewind apparatus comprises a transmission path extending from a rewind tool engaging component to a brake pad engaging portion. The transmission path comprises a clutch mechanism configured to slip at a predetermined torque. The manual rewind apparatus is a self-contained module configured for fitting to and/or removal from an adjuster system as a unit.

Preferably, the transmission path is formed of a rewind tool engaging component and an adjuster shaft.

More preferably, the manual rewind apparatus further comprises a cover which substantially surrounds a portion of the shaft and a cap mounted to the cover and configured to cover an outermost end of the shaft.

BRIEF DESCRIPTION OF THE DRAWINGS

Embodiments of the invention will now be described, by way of example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
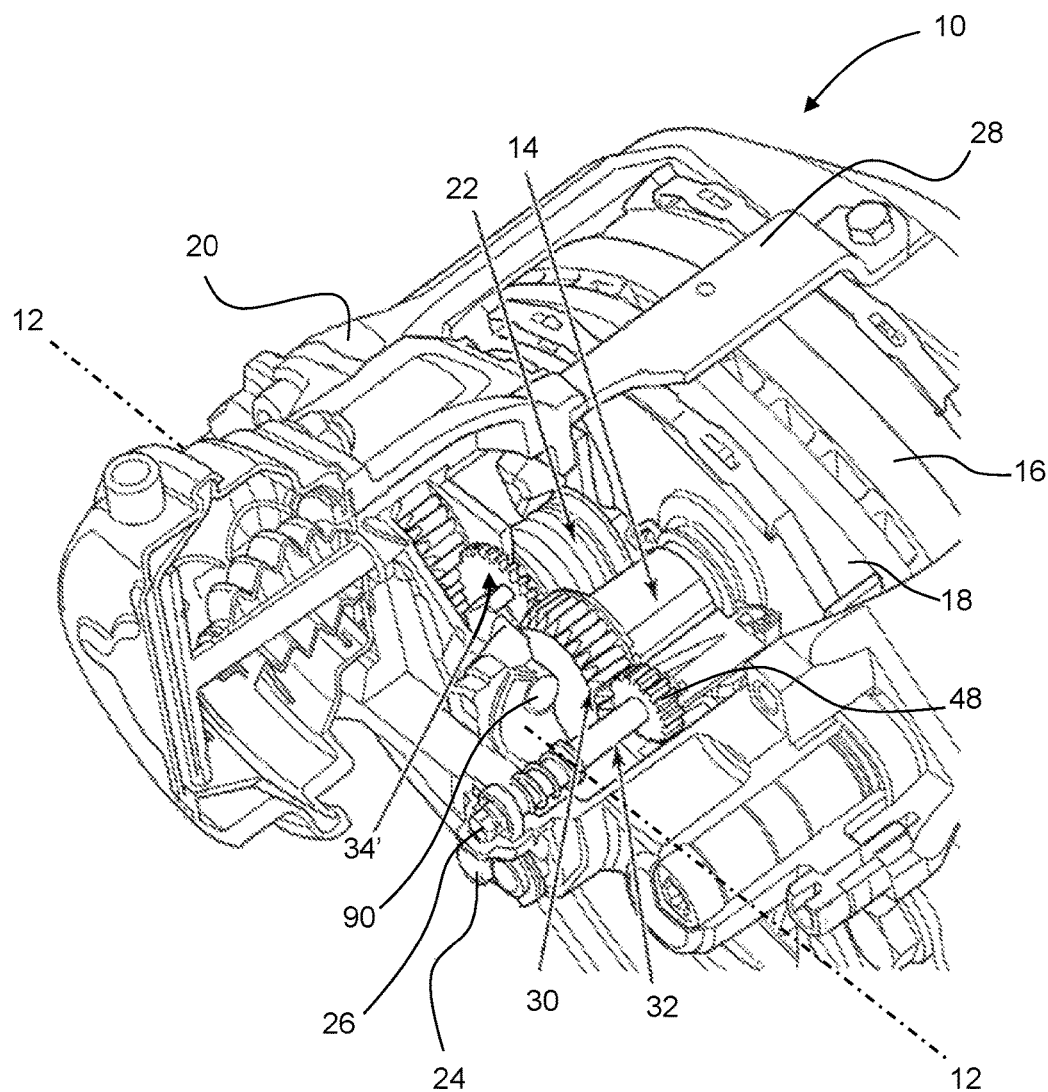
FIG. 1 is a partially cut away isometric view of a disc brake assembly of the prior art.

An exemplary disc brake of the prior art is illustrated in FIG. 1 and is indicated generally at 10. Operation of such disc brakes is well known, but briefly, to apply the brake a force is applied to an operating shaft 90 which pivots about an offset pivot axis 12. The pivoting motion of the operating shaft moves one or more pistons 14 towards a brake rotor 16 via roller(s) mounted offset to the axis 12. The piston(s) 14 are connected to an inboard brake pad 18 such that axial movement of the pistons 14 axially moves the inboard brake pad 18 towards the brake rotor 16. Once the inboard pad 18 contacts the brake rotor 16, the force of reaction acting through a caliper housing 20 that houses the pistons 14 and pulls an outboard pad on to the brake rotor. As a result, the inboard and outboard pads 18 clamp the brake rotor 16 and generate a frictional drag force that retards rotation of the rotor. To release the brake, a return spring returns the pistons 14 and operating shaft back to their "brakes-off" positions, leaving the pads with a running clearance to the brake rotor 16.

The caliper housing 20 is a cast steel component in which various bores and mating faces etc. are subsequently machined.

The operating shaft is connected to an adjuster system 22 such that when the operating shaft pivots, if adjustment to account for wearing of the friction material is required, the operating shaft rotates the adjuster system. This rotation extends the pistons 14 outboard towards the brake rotor 16 so as to move the brake pads 18 towards the brake rotor 16 and bring the running clearance back into to desired range.

With reference to FIG. 1, a separate electrical CWS 24 is typically fitted to the disc brake 10. The CWS 24 monitors the amount of friction material remaining on the pads 18, in order that users are aware of when the pads need replacing. The CWS 24 is typically linked to gears 30 of the adjuster system 22 that drive extension of the pistons 14.

When the pads 18 require replacement, a manual rewind apparatus 26 of an adjuster system 22 can be used to retract the pistons 14. A pad retainer 28 that extends across the pads is removed, and the worn pads are removed radially outwardly from the housing 20 with the housing in situ. However, because the replacement pads have a greater thickness of friction material compared to the worn pads the adjustment mechanism 22 needs to be de-adjusted or rewound to accommodate the new brake pads.

Figure 2:
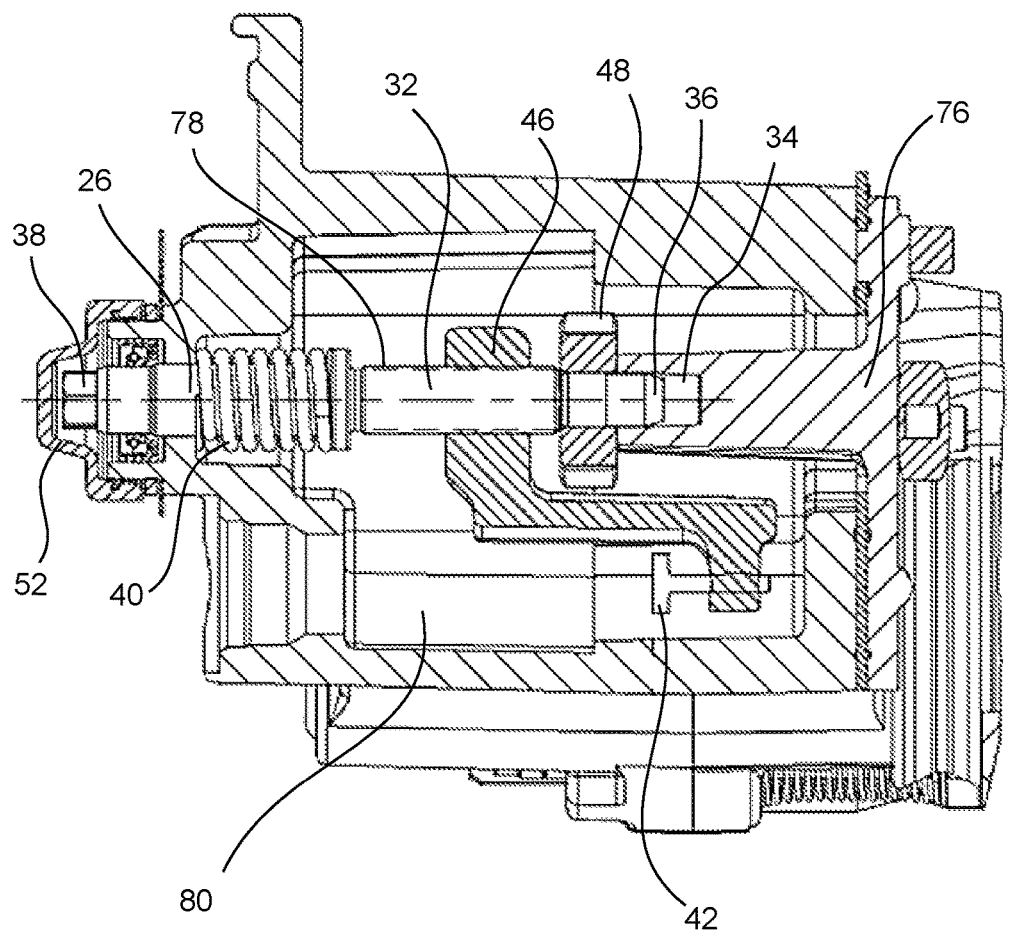
FIG. 2 is a cross sectional view of the disc brake assembly of FIG. 1.

Referring to FIG. 2, the disc brake of the prior art 10 is illustrated in more detail. The manual rewind apparatus 26 comprises a rewind shaft 32 that is connected to one of the gears 30 via a gear 48 secured to the shaft 32. Rotation of the manual rewind apparatus 26 results in rotation of the gear 30 via the gear 48 which in turn retracts an outer part of the piston relative to an inner part of the piston 14, the two parts being threaded together. A gear 34' rotationally connects the piston 14 to a further piston (not shown) and transfers the rewind rotation/retraction to the further piston.

An innermost (outboard) end 36 of the shaft 32 is rotatably mounted in a bore 34 of a cover plate 76 of the disc brake 10. The innermost end of the shaft 32 is positioned within the housing 20. The outermost (inboard) end 38 of the shaft protrudes from the housing 20 of the disc brake 10 and is provided with a hex head to engage with a tool such as a spanner or a wrench (not shown). The outermost end of the shaft 32 is covered with a sealing cap 52 which clips directly on to the housing 20 and the shaft 32 is supported for rotation within a bore 78. The adjuster system 22 is further provided with a return spring 40. The spring 40 also ensures that the shaft 32 is urged against the recess 34 of the cover plate 76, thus maintaining the desired axial position of the shaft 32 and also works to return the components, such as the spring 140, of the adjuster assembly back to their default position(s) when the load is removed. The manual rewind apparatus is assembled and replaced from the outboard side of the housing 20, by removal of the cover plate 76, which in turn means this must be done with the caliper housing being removed from the vehicle to which it is fitted.

The CWS 24 is separate to adjuster system 22 and is mounted to the housing 20 adjacent to but offset from the adjuster system via a separate bore 80 parallel to the bores 34 and 78. The CWS 24 is provided with a sensor (not shown), in the form of a linear potentiometer, located proximate an innermost end of the CWS. The bore 80 configured to receive the CWS 24 includes a substantially flat datum surface 42 that is used as a reference point for the sensor. The surface 42 is mounted to the housing via screw thread and so the position of the surface 42 can be adjusted within the housing. The adjustment of the position of the sensor enables the fine tuning of the CWS 24 to a calibrated value.

As the adjuster system 22 adjusts the position of the brake pads 18 to account for wear thereof. A component 46 extends between and substantially connects the bore 78 to the bore 80. The component is fixed with respect to the shaft 32 and so movement of the shaft 32 within the housing 20 changes the relative position of components 46 and the gear 48. The sensor is configured to measure this change in separation to provide an indication of the wear of the brake pad 18, and electronically transmit this to a remote location on the vehicle to which the brake 10 is fitted.

Figure 3:
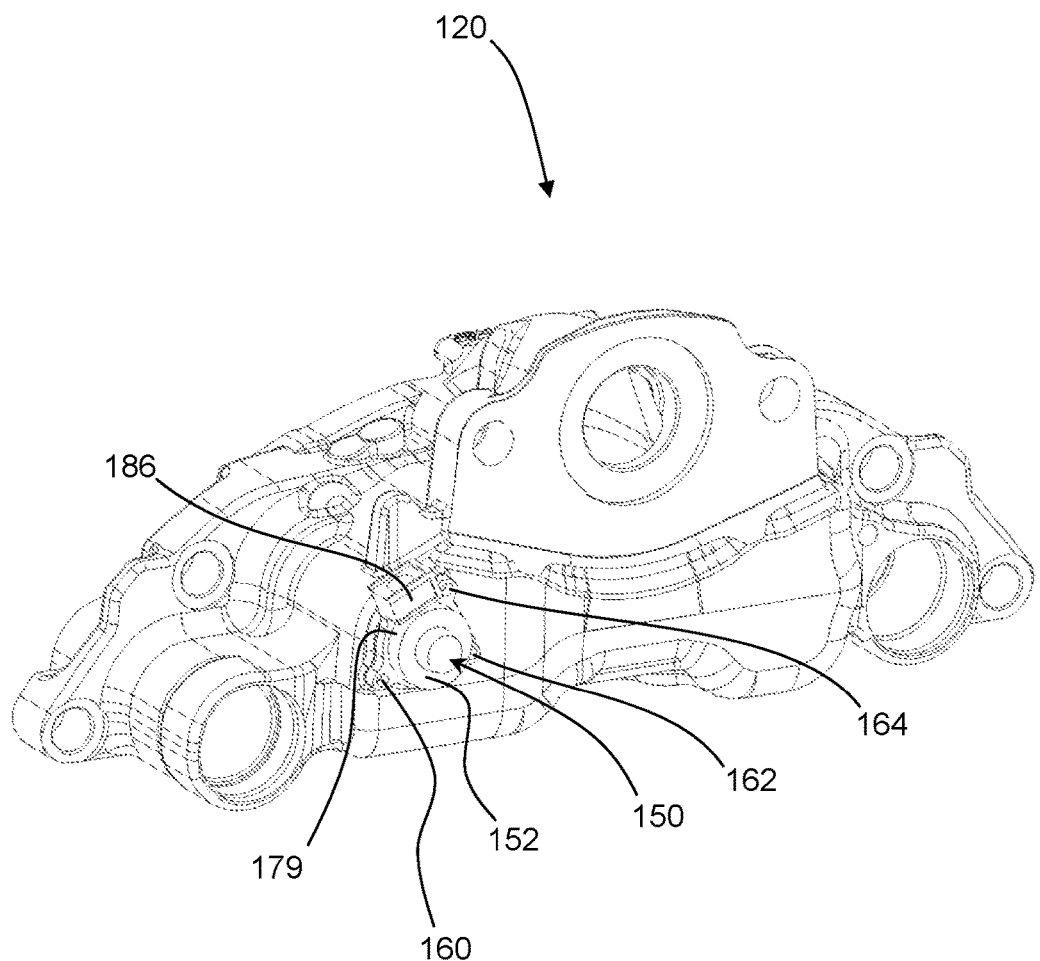
FIG. 3 is an isometric view of a disc brake assembly housing having an adjuster assembly according to an embodiment of the invention.
Figure 4:
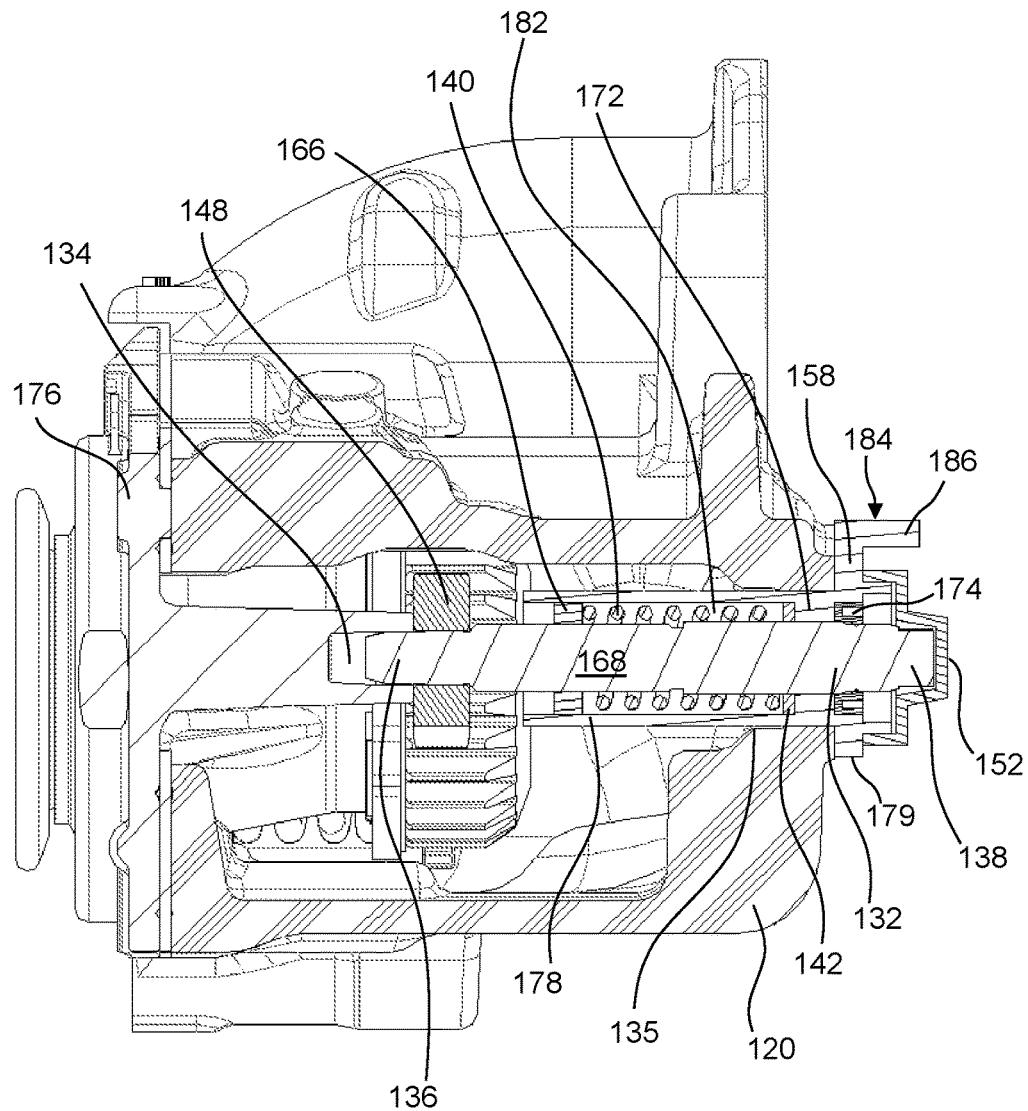
FIG. 4 is a cross sectional view of the disc brake assembly of FIG. 3 on the plane 4-4.
Figure 5:
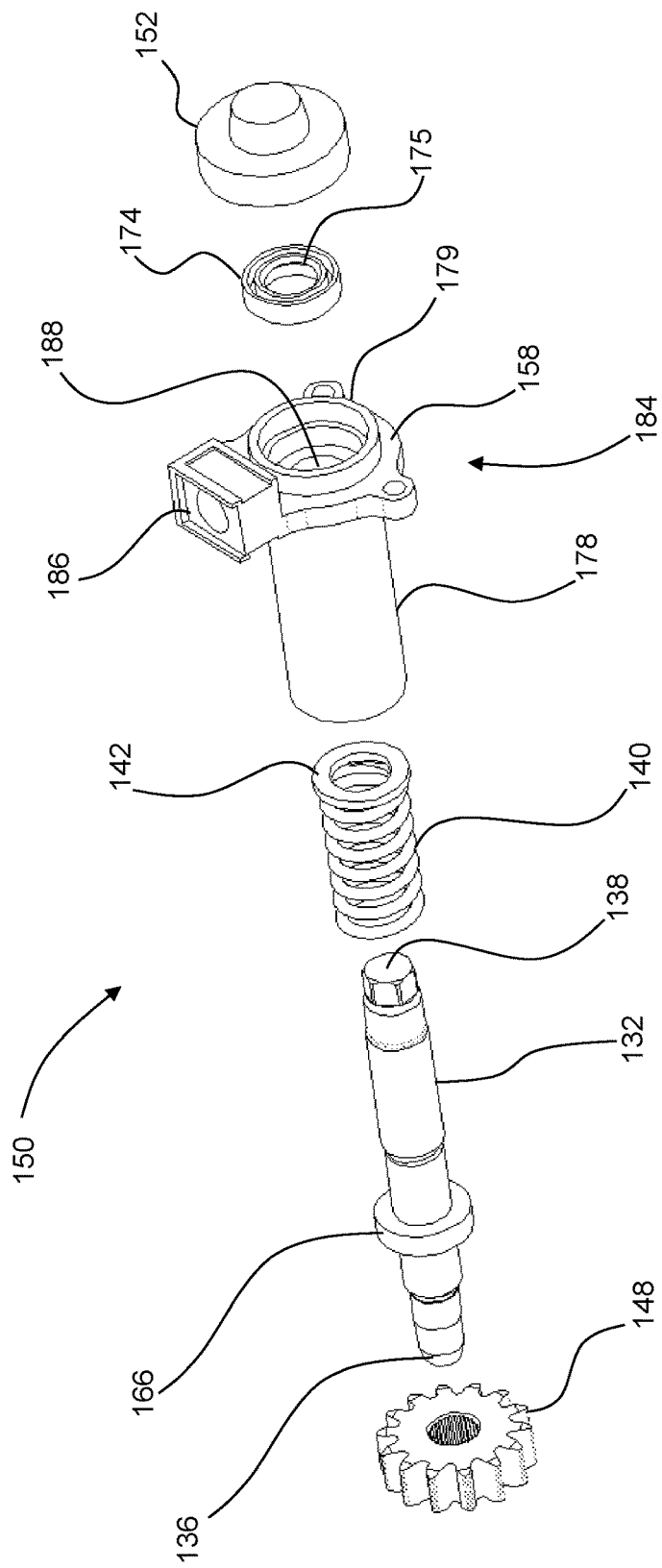
FIG. 5 is an exploded isometric view of the adjuster assembly of FIGS. 3 and 4

Referring now to FIGS. 3 to 5, a disc brake caliper housing indicated generally at 120 comprises an adjuster assembly 150 according to an embodiment of the present invention. The adjuster assembly 150 essentially combines a manual rewind apparatus and a CWS into a single assembly that can be fitted and removed from the brake caliper housing as a single unit. The housing 120 is similar to that of the disc brake of FIGS. 1 and 2. Corresponding components of the figures are labelled with the prefix '1' with respect to FIGS. 1 and 2, and only differences are discussed.

Referring to FIGS. 3 and 4, the adjuster assembly 150 is inserted into a recess 182 of the housing defined by bore 135 through the housing 120 and bore 134 in the cover plate 176. The bore 135 of the housing 120 provides support for the adjuster assembly 150.

An outermost end 138 of the shaft 132 extends outward from the recess and is covered by a cap 152. The manual adjuster assembly 150 is further provided with a cover 184 which substantially surrounds a portion of the shaft 132. The cover 184 also protrudes from the recess of the housing 120. A sleeve 178 of the cover 184 is accommodated within the housing 120 and a head 179 projects out of the housing. The cap 152 is mounted so as to substantially cover the end of the shaft 132 and part of the head 179. In this embodiment, the cap 152 is mounted directly onto the cover 184 rather than the housing 120 thus simplifying manufacture of the housing by not requiring a spigot to be provided therein to mount the cap.

The cover 184 is advantageously manufactured as a plastics component, e.g., as an injection molding from a suitable material such as ABS, Nylon or polypropylene. As such, relatively complex shapes may be manufactured at low cost, and the material is durable and corrosion resistant.

The junction between the sleeve 178 and head 179 of the cover 184 comprises a circumferential lip 158 to seat on an outer face of the housing 120. The circumferential lip 158 comprises three radial protrusions 160, 162, 164 around its outer edge. Each of the protrusions 160, 162, 164 has apertures therein to receive fasteners therethrough so as to secure the cover 184 to the housing 120 of the disc brake. An O-ring type seal (not shown) and/or a kit bead gasket (not shown) may be provided in some embodiments between the 158 and the housing 120.

A fourth protrusion 186 comprises an electrical connector having a socket to mate with a complementary connector on a vehicle to which the brake is fitted and enable electrical signals to be transmitted from a sensor to an ECU (not shown) of the vehicle so as to provide an operator with readings relating to the wear of the brake pads. In alternative embodiments, a cable or lead having a connector at its distal end to mate with a complementary connector on a vehicle could be provided instead of the protrusion 186.

Referring now to FIGS. 4 and 5, the adjuster assembly 150 is shown in more detail. The substantially cylindrical shaft 132 has a diameter that is stepped along its length.

The innermost end 136 of the shaft 132 is tapered so as to enable easier insertion of the adjuster assembly 150 into the bore 134 of the cover plate 176. The outermost end 138 of the shaft 132 is profiled so as to receive a hand or power tool (not shown) thereon so as to rotate the adjuster assembly 150 and hence the adjuster system of the disc brake when the brake pads need to be removed.

A gear 148 is provided proximate the innermost end 136 of the shaft 132 and is rotationally fixed with respect to the shaft 132. A middle section of the shaft 132 has a helical compression spring 140 arranged therearound.

The middle section of the shaft 132 is further provided with a screw thread (not shown) on the outer surface thereof and a nut 166 mounted thereon so as to engage with the screw thread of the shaft 132. The cover 184 is further provided with a substantially cylindrical sleeve 178 arranged to as to surround the spring 140 and a portion of the shaft 132.

The nut 166 has a non-circular radial outer face and the internal face of the sleeve 178 is profiled to be complementary and engage with the nut 166 and prevent rotation of the nut with respect to the sleeve 178. This results in a system where rotation of the shaft 132 results in in a linear change in the position of the nut 166 along the longitudinal axis of the shaft due to the relative rotation thereof.

A bearing 168 of the sleeve 178 receives the shaft 132 and permits its free rotation.

The sleeve 178 comprises a counterbore 172. A load sensor 142 is position so as to abut against a step 172 defined by the counterbore. The spring 140 is positioned so as to be loaded between the nut 166 and the load sensor 142.

An adjuster assembly seal 174 is located in a second counterbore 188 in the head 179 so as to seal around the shaft 132. The cover further comprises a circular lip 175 projecting inboard and arranged to receive the cap 152.

In use, as the brake pads become worn through repeated use, the adjuster system of the disc brake automatically extends the pistons to maintain a suitable running clearance between the brake pads and the rotor.

The gear 148 of the adjuster assembly engages with a gear of the adjuster system and this adjustment causes rotation of the gear 148 and hence the shaft 132. The sleeve 178 works so as to prevent the nut 166 from rotating and so this results in the shaft 132 rotating with respect to the nut 166 and causes the nut 166 to move in a direction parallel to the longitudinal axis of the shaft 132 towards the outermost end 138 of the shaft 132.

This movement of the nut 166 in turn changes the separation between the nut 166 and the load sensor 142 compressing the spring 140, resulting in an increased load applied to the load sensor 142 by the spring. The load sensor 142 outputs a signal indicative of the wear of the brake pads based on the load applied to it by the spring 140. Thus, the spring 140 of the adjuster assembly 150 provides the dual functions of sensing the wear of the pads and also urges the shaft 132 inwardly so that it securely abuts against the recess 134 of the cover plate 176.

When the brake pads are required to be replaced, an operator removes the cap 152 and uses a tool to rotate the shaft 132 and gear 148. This in turn rotates the gears of the adjuster system and resets the position of the brake pads to allow new, thicker pads to be inserted when the pads need to be replaced.

The adjuster assembly 150 is able to be fitted, and hence removed, as a single unit and it is only the gear 148 that remains inside the housing 120 when the adjuster assembly is removed. In this embodiment, the cover plate 176 is required to be removed so as to remove the gear 148. However, in alternative embodiments the bore 168 has a greater diameter and/or the gear 148 a smaller diameter so that the whole adjuster assembly 150 including the gear can be fitted and removed as a single unit from the inboard side rather than the rotor side of the brake.

In alternative embodiments, the shaft 132 and the gear 148 may be releasably secured to the housing 120 so as to be retained inside the housing 120 during replacement of the adjuster assembly 150. This arrangement would remove the need for calibration of the adjuster assembly 150 to be carried out after replacement, as the position of the nut 166 along the shaft 132 has remained fixed with respect to the amount of pad wear during the replacement process.

In the embodiment described above, the spring 140 is in an uncompressed state when new brake pads are fitted and the spring is compressed as the brake is adjusted for wear of the pads. However, the spring may be in a compressed state when new brake pads are fitted and then decompresses as the pads wear through use.

In alternative arrangements, different sensing mechanisms may also be used in place of the spring and load sensor, such as a linear potentiometer, a Hall Effect sensor, a rotation sensor, a laser or any suitable component for measuring linear or rotary movement.

In alternative arrangements, any suitable resilient mechanism may be used to urge the shaft 132 inwardly to maintain its position.

Figure 6:
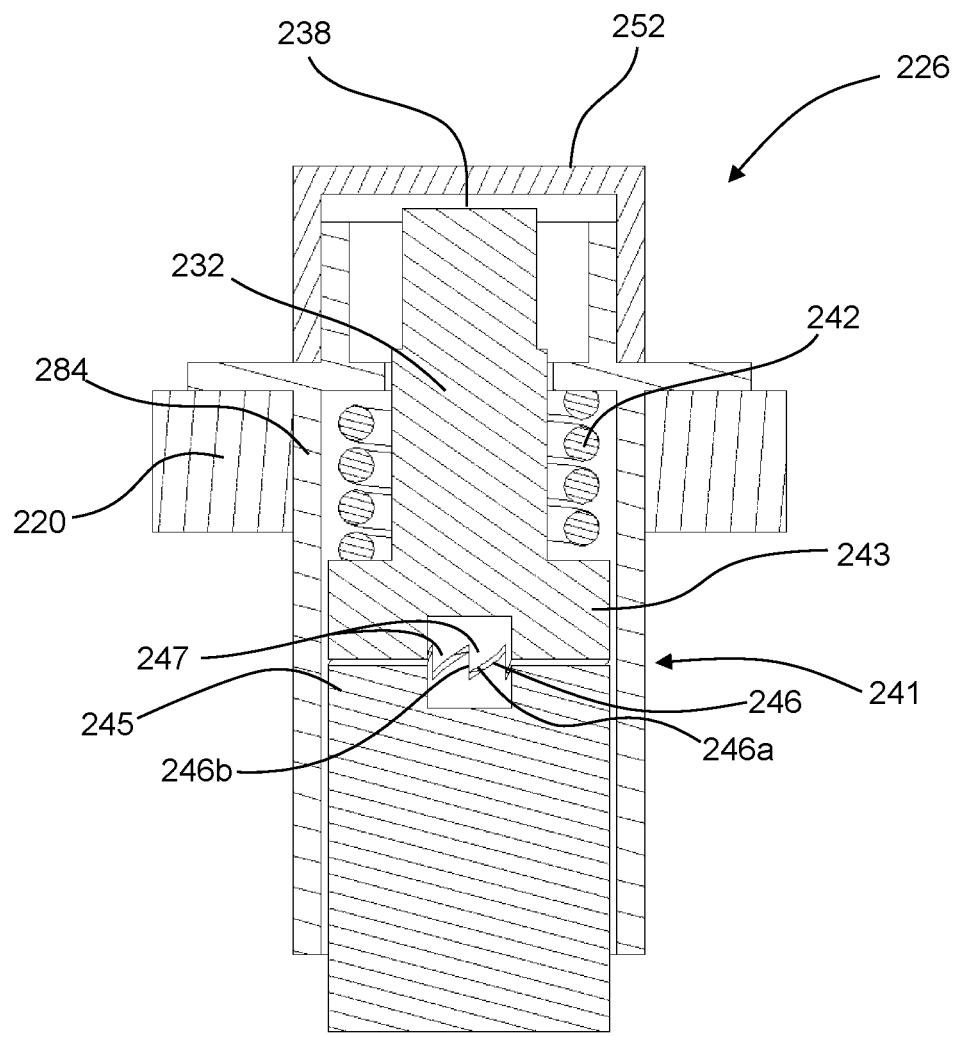
FIG. 6 is a cross-sectional view through a manual rewind assembly according to an embodiment of the invention.

Referring now to FIG. 6, a manual rewind apparatus according to an embodiment of the present invention is indicated generally at 226. Only features that differ from those of the first embodiment are discussed in more depth.

The manual rewind apparatus 226 has a rewind tool engaging component 238 and an adjuster shaft 232. The rewind tool engaging component 238 is dimensioned to receive a tool (not shown) for adjustment of the manual rewind apparatus 226. In this embodiment, the outer cross-section of the tool engaging component 238 defines a hexagonal shape, so is suitable for operation with a standard tool such as a metric spanner, wrench or socket. In an alternative embodiment, the tool engaging component defines a recess for receiving a tool, which is hexagonal. In an alternative embodiment, the recess is of some other suitable shape, or for example is configured to receive a star screwdriver, e.g., the recess is Torx® shaped. In an alternative embodiment the outer cross-section of the tool engaging component is of some other suitable shape, suitable for operation by a spanner or wrench of corresponding shape.

The tool engaging component 238 and the adjuster shaft 232 form a transmission path that extends from the tool engaging component 238 to a brake pad engaging portion (not shown). To manually operate the manual rewind apparatus 226 so as to move a brake pad away from a brake disc, a tool is engaged with the tool engaging component 238. The tool is turned, which turns the adjuster shaft 232. Once the shaft 232 is turned to the full extent of de-adjustment (or adjustment), further turning of the tool could lead to unwanted locking of the adjuster system. To prevent this, the transmission path also includes a clutch mechanism 241 configured to slip at a predetermined torque, in order to protect the adjuster system. By "slip", it is meant that the components of the clutch mechanism 241 move in relation to one another, so that relative rotation of the components of the clutch mechanism 241 is non-destructive and the mechanism is reusable at least one further time. No shearing of the clutch components takes place, and nor is there any plastic deformation.

The manual rewind apparatus 226 is a self-contained module configured for fitting to and/or removal from the adjuster system as a single unit that further comprises a cover 284. That is, the manual rewind apparatus 226 can be inserted in and removed from a disc brake caliper housing 220 in a single operation, making fitting or replacing the manual rewind apparatus 226 quick and easy. The clutch mechanism 241 is easily sealed behind a cap 252 that is mounted to the cover 284 and thus protected.

The clutch mechanism 241 is integral to the tool engaging component 238 and the adjuster shaft 232. A first clutch portion 243 is, in this embodiment, integral to the tool engaging component 238. A second clutch portion 245 is integral to the adjuster shaft 232. A compression spring 242 acts between the cover 284 and the first clutch portion 243 to bias the first clutch portion 243 towards the second clutch portion 245, such that engagement of the clutch portions 243, 245 occurs. The first and second clutch portions 243, 245 are configured to slip with respect to one another at a predetermined torque, as described in further detail below.

The first clutch portion 243 is in this embodiment of plastics material, although in alternative embodiments it may be of some other suitable material. That is, the tool engaging component 238 is of plastics material, such as ABS, Nylon or polypropylene. The tool engaging component 238 is thus lightweight and relatively inexpensive to produce.

The first and second clutch portions 243, 245 of this embodiment comprise corresponding teeth 247 configured to frictionally engage with one another up to a predetermined torque, i.e., a safe torque limit that will not lead to locking of the adjuster system. The teeth 247 of this embodiment extend in an axial direction. When a torque above the predetermined torque limit is applied, the force of the spring 242 is overcome, so that the first clutch portion 243 can move away from the second clutch portion 245 and the first clutch portion 243 slips with respect to the second clutch portion 245. The adjuster shaft 232 is thus not turned, and no adjustment takes place. No locking of the adjust system can therefore take place.

The teeth 247 are substantially triangular, with faces 246 that are angled with respect to the shared longitudinal axis of the tool engaging component 238 and the adjuster shaft 232. The angle of the faces 246 is configured to define the predetermined torque. The teeth 247 of this embodiment have first faces 246a, which engage to turn the adjuster shaft 232 in a first direction, at a first angle. The teeth 247 have second faces 246b, which engage to turn the adjuster shaft 232 in a second, opposite direction, at a second angle. The clutch mechanism 241 is thus configured to slip at a first predetermined torque in a first direction and at a second predetermined torque in a second direction.

The excess torque required to produce locking of the adjuster system may be different in each direction. Providing different predetermined safe torque limits in each direction thus allows the system to be protected in both directions, without having to limit torque to the lowest safe limit.

In an alternative embodiment, the angles of the faces 246a, 246b may be equal, so that the predetermined torque levels are equal.

It will be appreciated that by varying the axial load applied by the spring, the angles of the faces and the diameter of the circle defining the teeth (amongst other factors), that the predetermined torque levels may be achieved.

Figure 7:
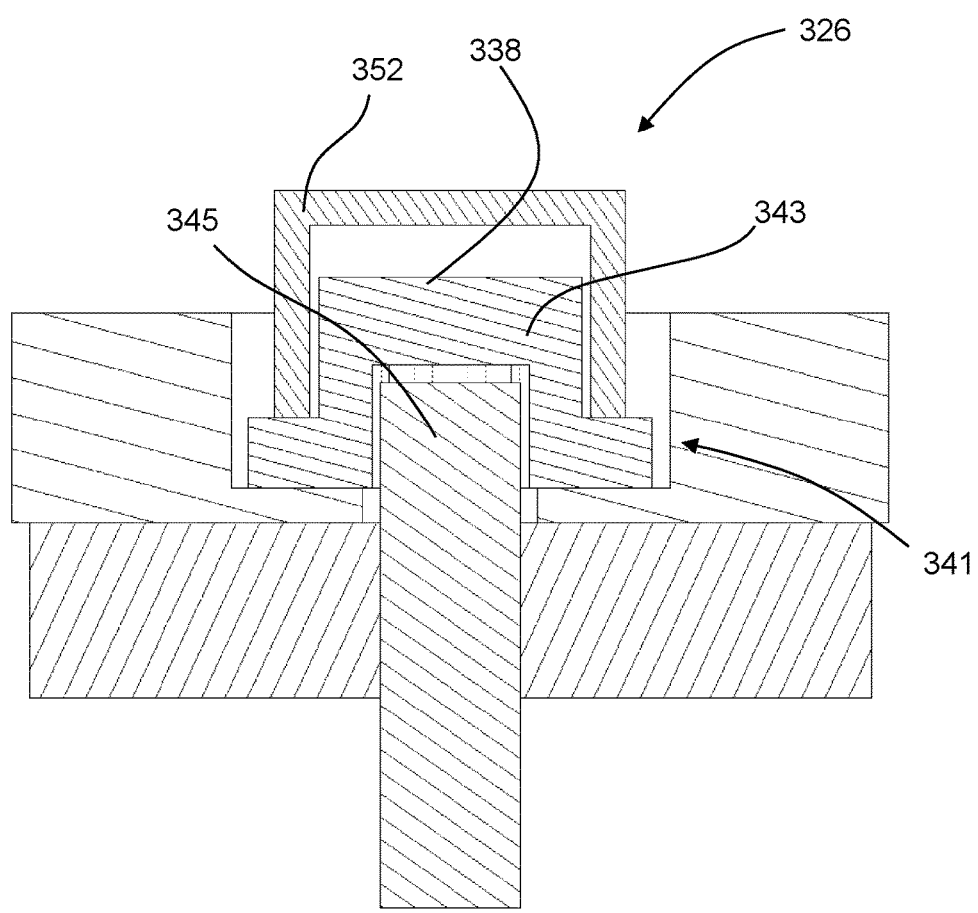
FIG. 7 is a cross-sectional view through a manual rewind assembly according to a further embodiment of the invention.
Figure 8A:
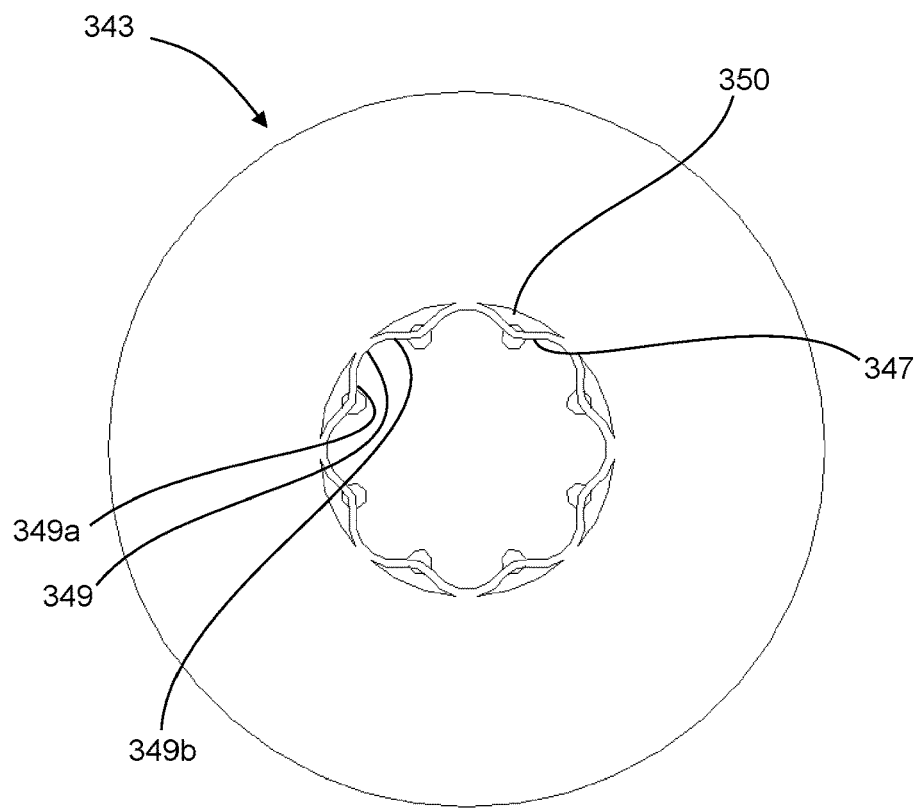
FIG. 8a is an axial end detail view of a first clutch portion of the manual rewind assembly of FIG. 7.
Figure 8B:
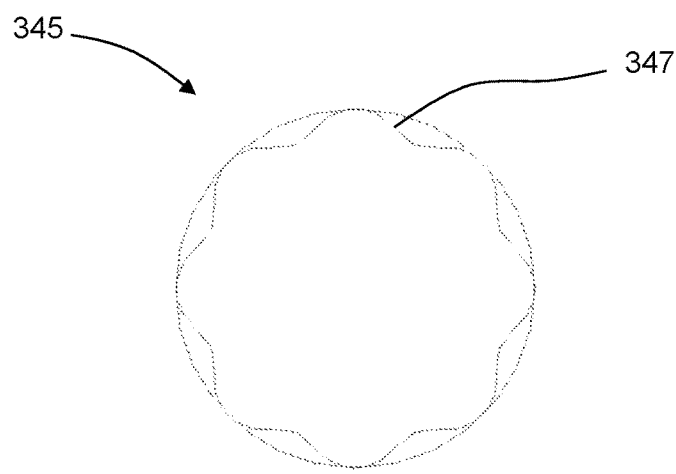
FIG. 8b is an axial end detail view of a second clutch portion of the manual rewind assembly of FIG. 7.

Referring now to FIGS. 7, 8a and 8b, a manual rewind apparatus according to a further embodiment of the present invention is indicated generally at 326. Features corresponding to those of the previous embodiment have been given corresponding reference numbers with the additional prefix "3". Only features that differ from those of the previous embodiment are discussed in more depth.

FIG. 7 shows a manual rewind apparatus 326 similar to that of the previous embodiment. The clutch mechanism 341 of this embodiment comprises first and second clutch portions 343, 345 having teeth 347 that extend in a radial direction. The first clutch portion 343 is concentrically arranged around the outside of the second clutch portion 345. In an alternative embodiment, the second clutch portion may be arranged outside the first clutch portion 343.

As can be seen in FIGS. 8a and 8b, the teeth 347 of this embodiment are curved or rounded, rather than triangular in shape, and radially rather than axially arranged. Curved recesses 349 are defined between each of the teeth 347 of the first clutch portion 343, as shown in FIG. 8a. Voids 350 are defined between each tooth 347 of the first clutch portion 343 and the outer circumference of the first clutch portion 343. The teeth 347 of the first clutch portion 343 are thus resilient. Slip occurs between the first and second clutch portions 343, 345 when this resilience is overcome by the level of torque being used to operate the tool engaging portion 338.

The recesses 349 are irregular in shape, having two sides 349a, 349b of different curvature. A different torque limit is thus provided in each direction, as with the previous embodiment.

A protective cap 352 is screwed to the cover. In this embodiment the cap 352 also serves to retain the tool engaging portion within the cover.

In certain embodiments different tooth profiles may be used for different models of brake supplied to different customers. Such models may have different torque requirements, and this would ensure that only the correct maximum torque may be applied for that model of brake.

Figure 9:
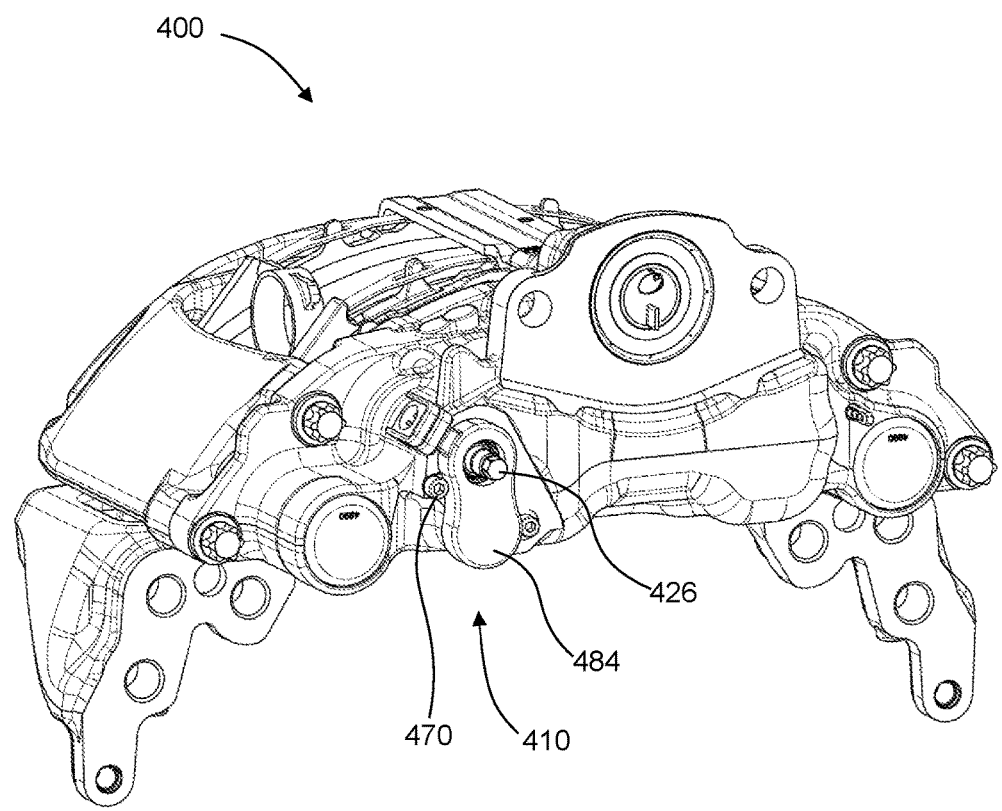
FIG. 9 is an isometric view of a disc brake assembly housing having an adjuster assembly according to an embodiment of the present invention.
Figure 10:
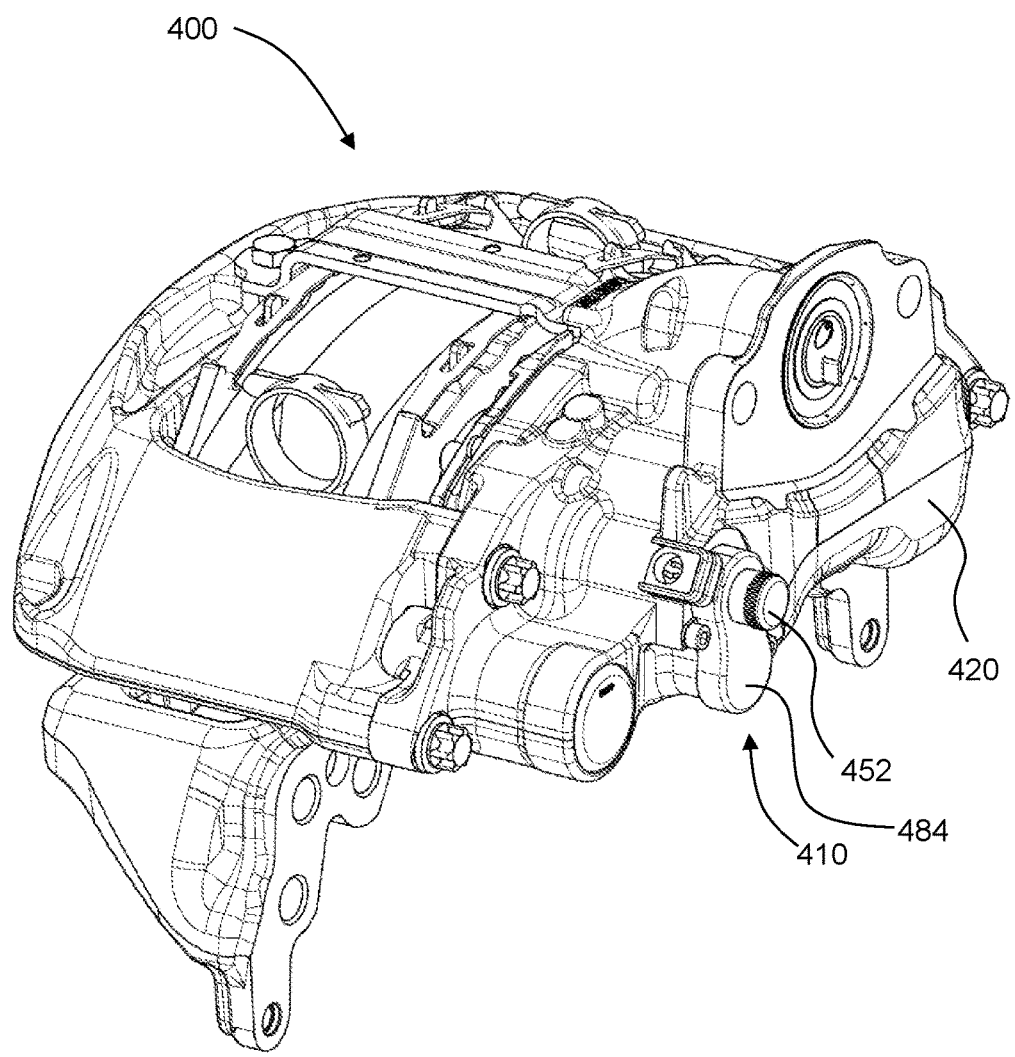
FIG. 10 is a further isometric view of the disc brake assembly housing of FIG. 9.

Referring now to FIGS. 9 and 10, a disc brake assembly housing with an adjuster assembly according to an embodiment of the present invention is indicated generally at 400. Only features that differ from those of the previous embodiments are discussed in more depth.

In other embodiments, other suitable mechanisms may be housed within the cover described above. For example a clutch mechanism utilizing a tolerance ring as described in the present applicant's application EP2602506 may be incorporated and certain advantages of the present invention be maintained. The content of EP2602506 is incorporated herein by reference.

Figure 11:
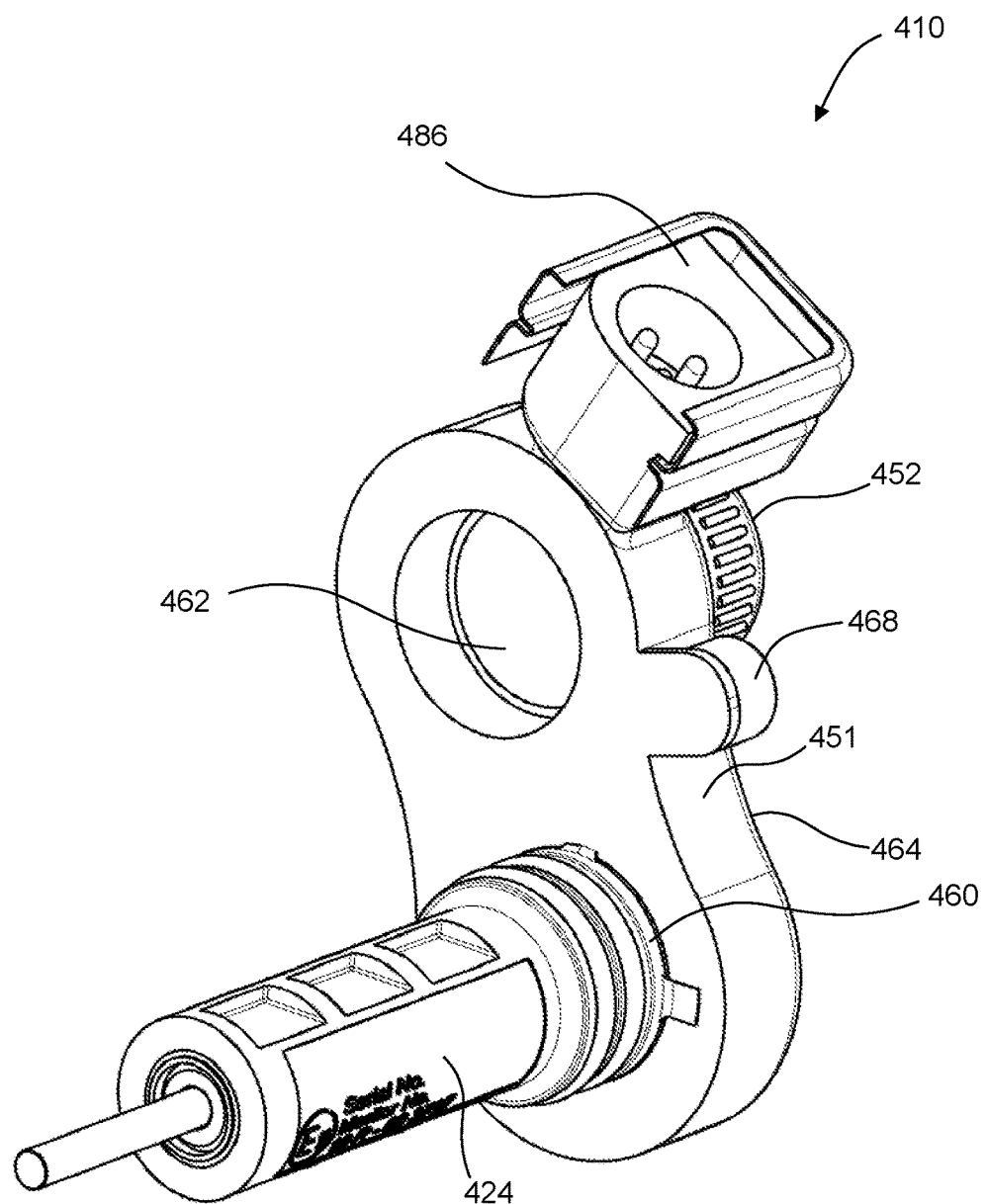
FIG. 11 is an isometric view of part of the adjuster system according to the embodiment of FIGS. 9 and 10.

Part of an adjuster assembly 410 is shown in FIGS. 9 and 10 located on a caliper housing 420 of a disc brake 400, and in more detail in FIG. 11.

The adjuster assembly 410 comprises further components (not visible) for automatically adjusting the position of a brake pad relative to a brake disc so as to maintain a suitable running clearance between the pad and disc in the disc brake 400 in a known manner. The adjuster assembly 410 has a manual rewind apparatus and a continuous wear sensor 424. The adjuster assembly 410 is shown in FIG. 11 without a manual rewind apparatus, for clarity, but is suitable for use with the manual rewind apparatus 226, 326 of either of the previous embodiments, or some other suitable manual rewind apparatus.

The adjuster assembly 410 also has a cover 484 configured to receive a manual rewind apparatus 426 and the continuous wear sensor 424. The cover 484 is of plastics material, so is lightweight and cost effective to produce in volume. The cover 484 has a body.

The cover body 451 defines an aperture 460 for the continuous wear sensor 424 and an aperture 462 for the manual rewind apparatus 426. The cover body 451 has an outer face 464 through which the apertures 462 extends. The outer face of the cover body 451 is planar. The cover body 451 is thus simple to manufacture.

The manual rewind apparatus 426 is received in the cover 484, as shown in FIG. 9. Operational access to the manual rewind apparatus 426 is provided via the aperture 462. A cap 452 configured for attachment to the outer cover face 464 is used to protect the manual rewind apparatus 426 when not in use. The cap 452 is in this embodiment threaded for screw attachment to corresponding threads (not shown) on the cover 484. In an alternative embodiment the cap has push-fit means of attachment, and is clipped onto a suitable corresponding feature on the cover.

The cover body 451 also has at least one projection 468 configured to receive a fastener 470. The fastener 470 secures the adjuster assembly 410 to the housing 420.

The cover body 451 also provides a socket 486 for connecting a lead from the continuous wear sensor to an ECU of the vehicle to which the brake is fitted.

In this embodiment the caliper housing 420 has the openings for the manual rewind apparatus and the CWS arranged in the same plane, such that machining the housing and sealing the cover to the housing is simplified.

The plastics material of the cover 484 is advantageously resistant to corrosion. This is of particular advantage when it comes to attaching the cap 452, as the cover to which the cap 452 is attached does not corrode, so the cap 452 is securely fitted in place.

In alternative embodiments, the cover includes a contact configured to indicate whether the cap 452 is properly fitted or not. The cover may include a sensor, e.g., a Hall Effect sensor, used to monitor adjuster function for diagnostic purposes. The cover may include an RFID tag. The cover may be secured to the housing by other means such as adhesive. The toothed clutch portions may be built-in, or may be retro-fitted. For example, retro-fittable parts may be provided with a new set of brake pads.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjuster assembly for manually adjusting a position of a brake pad relative to a brake rotor of a disc brake, the adjuster assembly comprising:
   a continuous wear sensor; and
   a manual rewind apparatus to manually reset the position of the brake pad when replacement thereof is required, the manual rewind apparatus having a shaft arranged to extend into a housing of the disc brake; and a cover that receives the continuous wear sensor and the manual rewind apparatus;

wherein the continuous wear sensor is arranged to be located within the housing of the disc brake and is located proximate to the shaft, and the cover along with the continuous wear sensor and the manual rewind apparatus are provided as a single assembly that is fittable and removable from the housing.

2. The adjuster assembly of claim 1 wherein the continuous wear sensor is arranged as part of a single unit with the manual rewind apparatus.

3. The adjuster assembly of claim 1 wherein the continuous wear sensor is disposed along a longitudinal axis and the shaft is disposed along another longitudinal axis that is disposed parallel to and is not coaxially disposed with the longitudinal axis of the continuous wear sensor.

4. The adjuster assembly of claim 3 wherein the cover further comprises a sleeve, wherein the sleeve substantially surrounds a portion of the shaft.

5. The adjuster assembly of claim 1 wherein the shaft defines a longitudinal axis and the continuous wear sensor defines a longitudinal axis and the longitudinal axis of the shaft is substantially parallel to the longitudinal axis of the continuous wear sensor.

6. The adjuster assembly of claim 1 wherein the continuous wear sensor is mounted concentrically around the shaft.

7. The adjuster assembly of claim 1 wherein the continuous wear sensor further comprises a first part that is arranged to move in response to rotation of the shaft so as to indirectly sense wear of the brake pad.

8. The adjuster assembly of claim 7 wherein the first part is arranged to move linearly with respect to a second part that remains substantially stationary.

9. The adjuster assembly of claim 7 wherein the first part is arranged to move rotationally with respect to a second part that remains substantially stationary.

10. The adjuster assembly of claim 7 wherein the first part is mounted such that rotation of the shaft causes threadable linear motion of the first part relative to the shaft.

11. The adjuster assembly of claim 10 wherein the shaft is threaded.

12. The adjuster assembly of claim 10 wherein the cover has a sleeve that substantially surrounds a portion of the shaft and the sleeve is arranged to prevent rotation of the first part.

13. The adjuster assembly of claim 7 wherein the continuous wear sensor further comprises a resilient element mounted between the first part and a second part, wherein the first part is arranged to move with respect to the second part and the second part remains substantially stationary.

14. The adjuster assembly of claim 13 wherein the second part is a load sensor.

15. A disc brake assembly comprising:
a brake caliper having a housing; and
an adjuster assembly that includes:
    a continuous wear sensor;
    a manual rewind apparatus to manually reset a position of a brake pad when replacement thereof is desired, the manual rewind apparatus having a shaft arranged to extend into the housing, wherein the continuous wear sensor is arranged to be located within the housing and is located proximate to the shaft; and
    a cover that receives the continuous wear sensor and the manual rewind apparatus, wherein the cover along with the continuous wear sensor and the manual rewind apparatus are provided as a single assembly that is fittable and removable from the housing;
wherein the continuous wear sensor is mounted to the housing via the adjuster assembly.

16. The disc brake assembly of claim 15 wherein the housing further comprises a recess that facilitates mounting of the shaft to the disc brake assembly.

17. The disc brake assembly of claim 16 wherein the cover being arranged to mount the shaft and the continuous wear sensor to the housing.

* * * * *